US007899576B2

(12) United States Patent
Pentland

(10) Patent No.: US 7,899,576 B2
(45) Date of Patent: Mar. 1, 2011

(54) METHOD AND APPARATUS FOR CONTROLLING THE SPATIAL POSITION OF REPETITIVE UNITS

(75) Inventor: Joseph C. Pentland, Bridgeport, CT (US)

(73) Assignee: Pentland LLC, Bridgeport, CT (US)

( * ) Notice: Subject to any disclaimer, the term of this patent is extended or adjusted under 35 U.S.C. 154(b) by 1042 days.

(21) Appl. No.: 11/678,567

(22) Filed: Feb. 23, 2007

(65) Prior Publication Data

US 2008/0208388 A1 Aug. 28, 2008

(51) Int. Cl.

| | |
|---|---|
| ***G06F 7/00*** | (2006.01) |
| ***G05B 11/01*** | (2006.01) |
| ***G05D 1/10*** | (2006.01) |
| ***G05D 3/00*** | (2006.01) |

(52) U.S. Cl. ........... 700/213; 700/19; 700/303; 700/302; 362/239; 446/227

(58) Field of Classification Search ........................ None
See application file for complete search history.

(56) References Cited

U.S. PATENT DOCUMENTS

| | | | | |
|---|---|---|---|---|
| 5,997,151 | A * | 12/1999 | Douglass, II | 362/239 |
| 2005/0178036 | A1 * | 8/2005 | Henick et al. | 40/617 |
| 2008/0020672 | A1 * | 1/2008 | Osborn | 446/227 |

* cited by examiner

*Primary Examiner* — Gene Crawford
*Assistant Examiner* — Yolanda Cumbess
(74) *Attorney, Agent, or Firm* — Drinker Biddle & Reath LLP

(57) ABSTRACT

An apparatus and method for a system for synchronously positioning repetitive units spatially comprising a plurality of repetitive units, each attached on an end of a plurality of arms, each angularly attached on an opposing end to a computer-controlled rotating axle, each having a synchronously computer-controlled position along a path of travel by computer-controlled synchronous rotation of said plurality of axles, forming a moving geometric pattern with said plurality of repetitive units.

24 Claims, 12 Drawing Sheets

METHOD AND APPARATUS FOR CONTROLLING THE SPATIAL POSITION OF REPETITIVE UNITS

BACKGROUND OF INVENTION

1. Field of the Invention

This invention relates generally to positioning objects in a space and, more particularly, to synchronously positioning objects to create a pattern.

2. Background Art

Kinetic art or mobiles typically include various suspended ornamental elements that have permanent geometric shapes or that depict a particular subject matter. If the mobile is mounted in a room where the decor is periodically changed, an entirely new mobile must often be purchased to properly coincide with the new theme of the room. Moreover, even if the decor of the room remains static, the user of the mobile may tire of the particular subject matter depicted by the mobile. Kinetic art objects often include various parts that have repetitive motion along a particular path, which is frequently a path in a three dimensional space. Various peripheral objects arranged in a pattern may be attached to a base object or multiple base objects and are attached such that the peripheral objects move freely with respect to the base objects. Motion is often induced by a force input to the peripheral objects such as, for example, force inputs from wind currents or physically touching the objects. The arrangement of the peripheral objects and their related movements may form a distinctive pattern or work of art.

Conventional hanging mobiles typically are secured to a fixed base object and various units are suspended by wires or other members from the base object above a location where the mobile can be viewed from various perspectives. These mobiles often have elaborate mechanisms for attachment to a fixed base object, and objects hanging from long strings or wires are allowed to move freely, extending from the ends of the mobile arms. A string or rod often suspends these mobiles so that the mobile can freely rotate or move in response to a force input. Some conventional mobiles are motorized and can rotate in a predetermined direction for visual stimulation.

Kinetic art has been around since the turn of the century. Kinetic art, such as, for example, what is commonly referred to as a mobile, is one of the more common types of kinetic art, however, there are other types as well. Briefly, a mobile is usually a suspended structure having a spidery construction made of objects or units hung on vertical strings from various points on horizontal arms. Typically the structure is delicately balanced and capable of free movement for sensitivity to breezes or light touch, which in consequence sets the arms and objects into a lazy motion. Artist Alexander Calder invented what has commonly been called the mobile. A mobile can be defined as a decorative, three dimensional art object mounted in a hanging position that is free to move in any of its planes. A mobile has the ability to transform itself into countless configurations because of the infinite number of potential positions available to each hanging object and the various perspectives from which to view the objects, thereby holding the viewer's interest.

In addition, there are various other types of kinetic art, such as, for example, a kinetic sculpture having a generally tubular motion-imparting device rotatably mounted on a base structure. The tubular device can include a substantially open, generally irregular top and can be rotated by a motor mounted on the base structure about its major longitudinal axis or the kinetic sculpture can be motorless and alternatively set in motion by a light touch. The kinetic sculpture often remains upright and is balanced by a series of counterbalances and magnets. An object such as a figure, toy or the like can be releasably rotatably connected to the tubular device and generally upwardly therefrom. The releasable connection can include a spring-biased member that rotates with the tubular device through a predetermined arc of revolution from where it is returned to its initial position by a biasing spring. The biasing spring can be mounted on the base in engagement with an offset arm extending generally radially from the rotational axis of the object to constantly urge the object in a direction of rotation opposite the rotation of the drive tube. A cantilevered object can be positioned in the path of travel of a member for repeated striking by the respective member as the drive tube continues to rotate.

The term "kinetic art" can also refer to paintings or pictures that have been designed to be shaped in a manner and displayed in 3 dimensions to afford the viewer different images dependant upon the viewer's position in relation to the art. Kinetic art can consist of a repeated pattern of objects or units of equal size separated by channels or spaces which define the precise location. However, traditional kinetic art is lacking in that its motion is often times random and unpredictable. The randomness creates an infinite number of configurations but often can be somewhat unappealing to the eye, or at least monotonous over time. Even with motorized mobiles or kinetic sculptures there is often still an element of randomness, and the motorized feature generally only induces the identical repetitive motion over and over. Therefore, a need exists for an apparatus and method to control a kinetic art presentation that allows for precision control over the speed and direction of the piece's movements.

BRIEF SUMMARY OF INVENTION

The invention involves controlling repetitive units, such as, for example, balls spinning on an arm about one or more axes. In one embodiment, a computer/microprocessor can be connected, either via wire or wirelessly, to a motor, for example, a stepper motor (see Intelligent Motion Systems' MDI Plus stepper motor series as an example—www.imshome.com). Because of the computer/microprocessor control over the motor, the direction of rotation and the speed of rotation or other movement can be precisely controlled. Unique configurations, from highly synchronistic moving patterns to seemingly random arrangements, can be created. The embodiment comprises the sum of multiple kinetic units, where each kinetic unit is a system that rotates or sets in motion 1 repetitive unit, for example, a ball. If rotating, the axis of rotation for a repetitive unit can be the shaft of the motor, and an arm can be connected to the motor shaft directly.

The axis of rotation can be concentric or non-concentric with the motor shaft. If the axis of rotation is not concentric with the motor shaft, then it can be necessary to use additional shafts/couplers/angle drives/structural supports to ensure that the motor rotation and torque are properly translated to the final/ultimate drive shaft or axle. This will ensure the proper axis of rotation is realized. Depending on the torque generated by the spinning arm and 'repetitive unit', a flexible drive shaft could be substituted for some or all of the additional shafts, shaft couplers and angle drives.

The generic term 'repetitive unit' can be utilized to describe the unit at the end of the rotating arm. The arm need not be straight and the repetitive unit can be any shape and size desired. The 'repetitive unit' can be repeated or varied from unit to unit and its travel along its path of motion is capable of generating a pattern over multiple units. As an example, it is just as likely a 10" hollow tube is attached to a 6" 'S' shaped arm as it is that a 4" ball is attached to a 20" straight arm. As a further example, the repetitive unit can have a pipe organ-like tube structure (or any other shape adapted for generating a tonal response when air is forced through and/or around it) attached to the end of the rotating arm. In this case, when the arm rotates, air can flow through the tube, generating a tonal response proportional to both the exact shape of the tube and the speed of the rotating arm. By varying the sizes and shapes of the organ tubes along with the velocities of the rotating arms, multiple units can be imagined to create interesting and unique sonic responses, possibly even music.

One embodiment of the present system for synchronously positioning repetitive units comprises a plurality of axles each having an axis of rotation, where each of said plurality of axles is drivably coupled to a computer-controlled motor for effecting rotation of said plurality of axles about said axis of rotation; a plurality of elongated arms each having a first end and a second end, where each of said arms is attached proximate said first end at an angle to one of said plurality of axles; and a plurality of repetitive units where each unit is attached proximate said second end of one of said plurality of elongated arms, where said computer-controlled motor independently and synchronously controls each of said plurality of axles for independently and synchronously positioning said plurality of elongated arms and repetitive units attached thereto.

In certain embodiments, the motor's wiring can present a problem. If it is desired to have a series of kinetic units where the wiring of individual units must be hidden, routing the wiring such that it does not become tangled in the rotating arms becomes an issue. If the sizes of the kinetic units are relatively small, a special motor with an open center can be used (see Intelligent Motion Systems' IOS motor series as an example—www.imshome.com). By having an open center to the motor, a thin wiring conduit can be run through the open center to safely house any wiring as well as support multiple kinetic units. In this configuration, the rotating arm attaches to the motor just outside the center hole while the wiring is run directly from the motor into and through the wiring conduit. Neither the conduit nor anything inside it is subjected to any of the forces rotating the arm, ensuring the wiring will not become entangled. If larger kinetic units are required, simple stepper motors with an open center may not suffice because of the additional weight of the units. In this case, a traditional motor can be connected to a gear, while the gear in turn is connected to a geared bearing attached to a central hollow shaft. The hollow shaft, in addition to acting as a conduit for the motors' wiring, also gives the structural support necessary to support all the kinetic units. In both cases, the axis of rotation is the radial center of the central hollow shaft/conduit. For generalness, from here on the type of motor support configuration outlined in this paragraph will be called a centerless motor.

As mentioned above, sound can be introduced into several of the embodiments by having air flow through sound inducing repetitive units. Additionally, it is possible to add sound and music to the embodiments in at least two ways. By adding surrounding speakers, music can be integrated into the embodiments, performing in tandem with the kinetic units. In one example of this, the pattern programmed into an embodiment can be designed so that it is in synchronicity with a song being broadcast through the surrounding speakers. The rotation can be programmed to respond to the spectral profile. Second, music can be picked by the programmer/viewer and the arms of the embodiment can be programmed to rotate based on a selected criterion of the music, for example the song's equalizer output. As an example of this approach, consider a song chosen by a viewer and input into the controlling program of the installation. When the song plays, the master program rotates each of the rotating arms at a velocity proportional to a predetermined band of the equalizer. So, if a song with a lot of treble is played, then certain rotating arms would rotate quickly (the arms programmed to rotate proportionally to the treble level inputs), whereas if a song with a lot of base is played, other rotating arms would rotate quickly. This approach differs from the first in that the first requires the programmer to spend considerable time in the pattern/music synchronization process, whereas in this approach, the music itself determines the pattern created.

Finally, lighting can be integrated into the embodiments, both externally and internally. Externally, for example, properly placed point lights can add to the appeal of an embodiment by producing sharp shadows of the rotating repetitive units on the surrounding wall(s), floor(s), and/or ceiling(s). Internally, for example, battery or slip ring provided electricity can power LEDs or other light types. For instance, if the repetitive unit is a translucent hollow sphere, one or more LEDs can be placed inside the unit, each LED attached to a power source. In this instance, if a slip ring and relays are used, then lighting the system can be managed with computer/microprocessor control, therein allowing illumination of the repetitive unit with any of the colored LEDs inside it, where the color of choice can be changed on command. The lights can be illumination controllable adapted for selective illumination responsive to a computer-controlled series of positions. Finally, lighting could be achieved passively by coloring parts of the embodiment glow in the dark.

The present invention can generate both patterned and random movements, all through computer control. These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
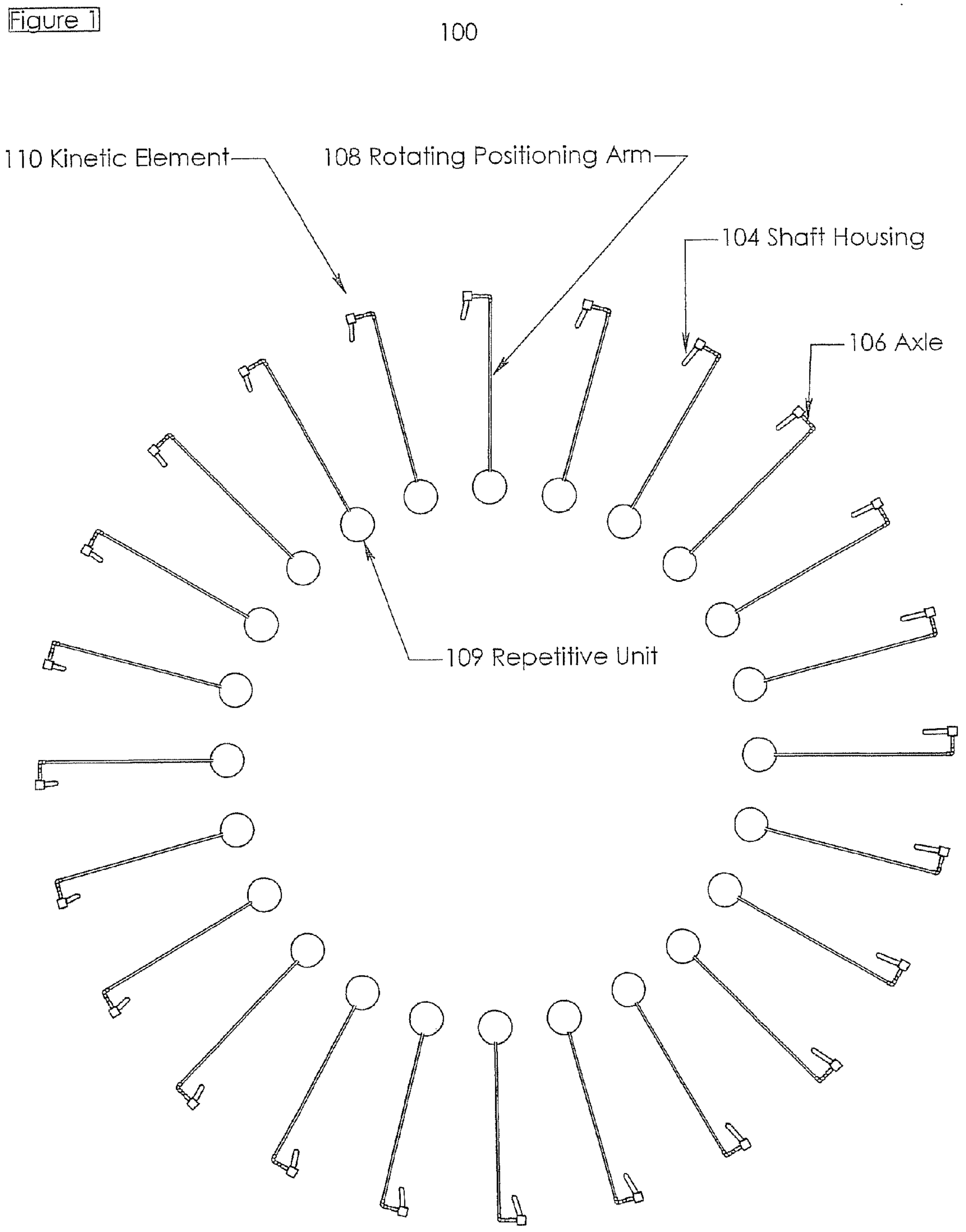
FIG. 1 is a top view illustrative of the apparatus at rest.

According to the embodiment(s) of the present invention, various views are illustrated in FIGS. 1-12 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a motorized base unit and rotatably attached peripheral member teaches a novel apparatus and method for implementing an art design.

The details of the invention and various embodiments can be better understood by referring to the figures of the drawing. Referring to FIG. 1, a kinetic repetitive unit positioning system 100 is shown. The positioning system 100 is shown having a plurality of kinetic elements 110, which are arranged in a circular pattern. The kinetic elements 110 are shown equally spaced apart and forming a circular pattern. Each kinetic element 110 includes a base unit (not shown in this Fig.; see item 401 of FIG. 4), which is capable of supporting the remainder of the element and housing a motor operable to drive the element. Each kinetic element can also include shaft couplers, a shaft housing 104, a drive shaft contained in said shaft housing, an angle drive, an axle 106, an angled shaft coupler, a positioning rotation arm 108, and a repetitive unit 109. The axle 106 by way of an angle drive and a drive shaft can be powered by a motor to effect movement of the positioning arm 108.

Figure 2:
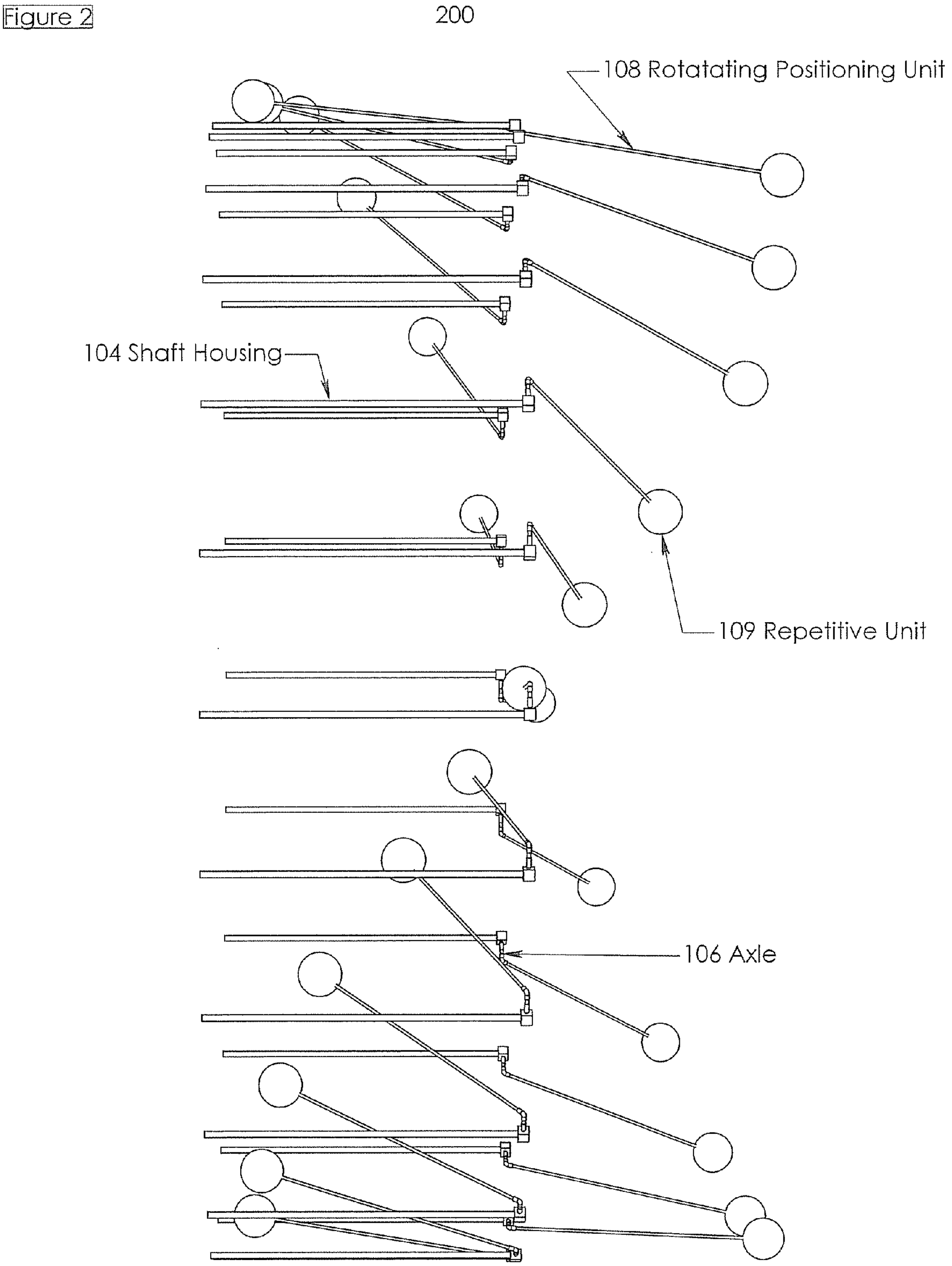
FIG. 2 is a side view of the apparatus in motion, but mounted to the wall.

Another embodiment as shown in FIG. 2 is essentially the same configuration as that in FIG. 1. However, on this occasion the kinetic positioning system is mounted on a wall 200. The wall mount configuration as shown in FIG. 2 reveals the type of pattern that can be generated by such a kinetic element positioning system.

Figure 3:
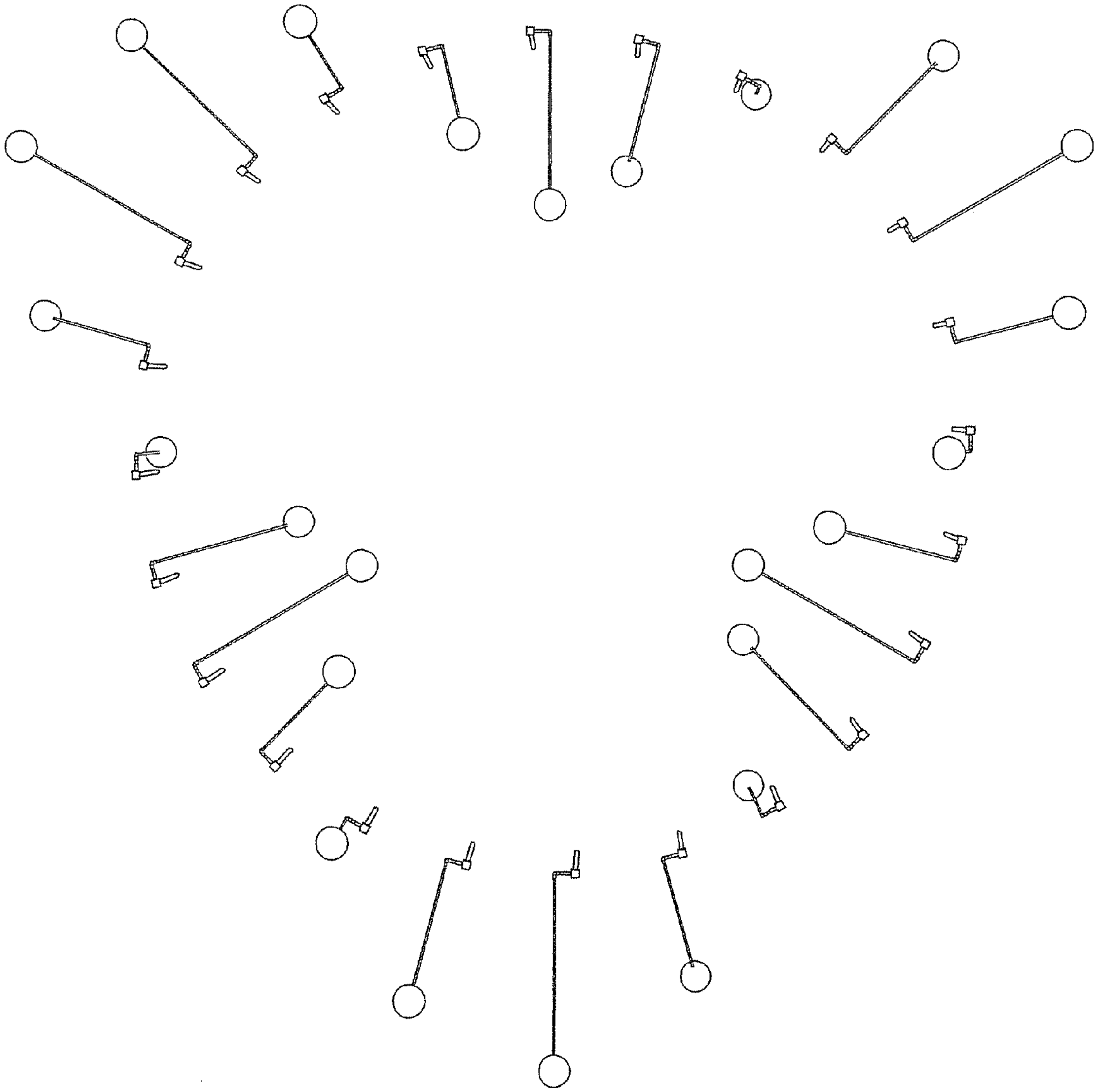
FIG. 3, is a top view illustrative of the apparatus in motion.

Referring to FIG. 3, a top view of the kinetic element positioning system 100 is shown. It can be seen from this top view that the kinetic elements 110 are shown arranged in a moving pattern.

Figure 4:
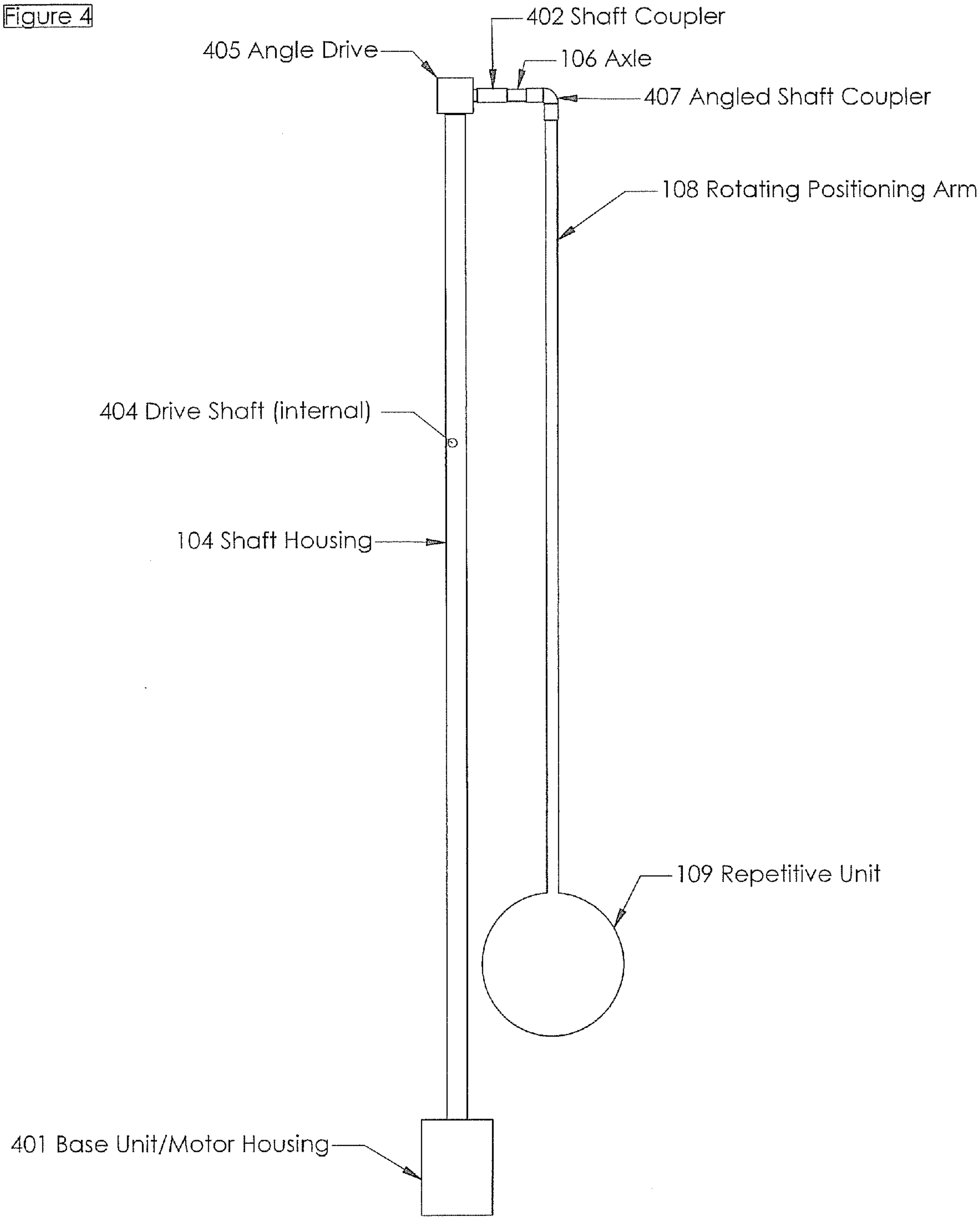
FIG. 4, is a side view illustrating a base unit and attached repetitive unit.

Referring to FIG. 4, a side view of a kinetic element 110 is shown. This embodiment of a kinetic element 110 includes a base unit 401 housing a motor and supporting an upright shaft housing 104 which supports the angle drive 405 and housing assembly. An axle 106 is rotatably attached to the drive shaft 404 through the angle drive 405 whereby the motor can effect rotation of the axle 106. A positioning rotation arm 108 is shown attached to the axle 106 by an angled shaft coupler. The angular attachment such as the angled shaft coupler as shown in FIG. 4 of this embodiment is a right angular elbow attachment attaching the positioning arm 108 at an angle 502, which in this case is a 90 degree angle. However, the angle 502 can vary from greater than 0 degrees to lesser than 180 degrees with respect to the axle 106. In the embodiment shown in FIG. 4, the repetitive unit 109 is a spherical object or a ball attached to an end of the positioning arm 108 opposite the point of attachment between the positioning arm and the axle 106.

Figure 5:
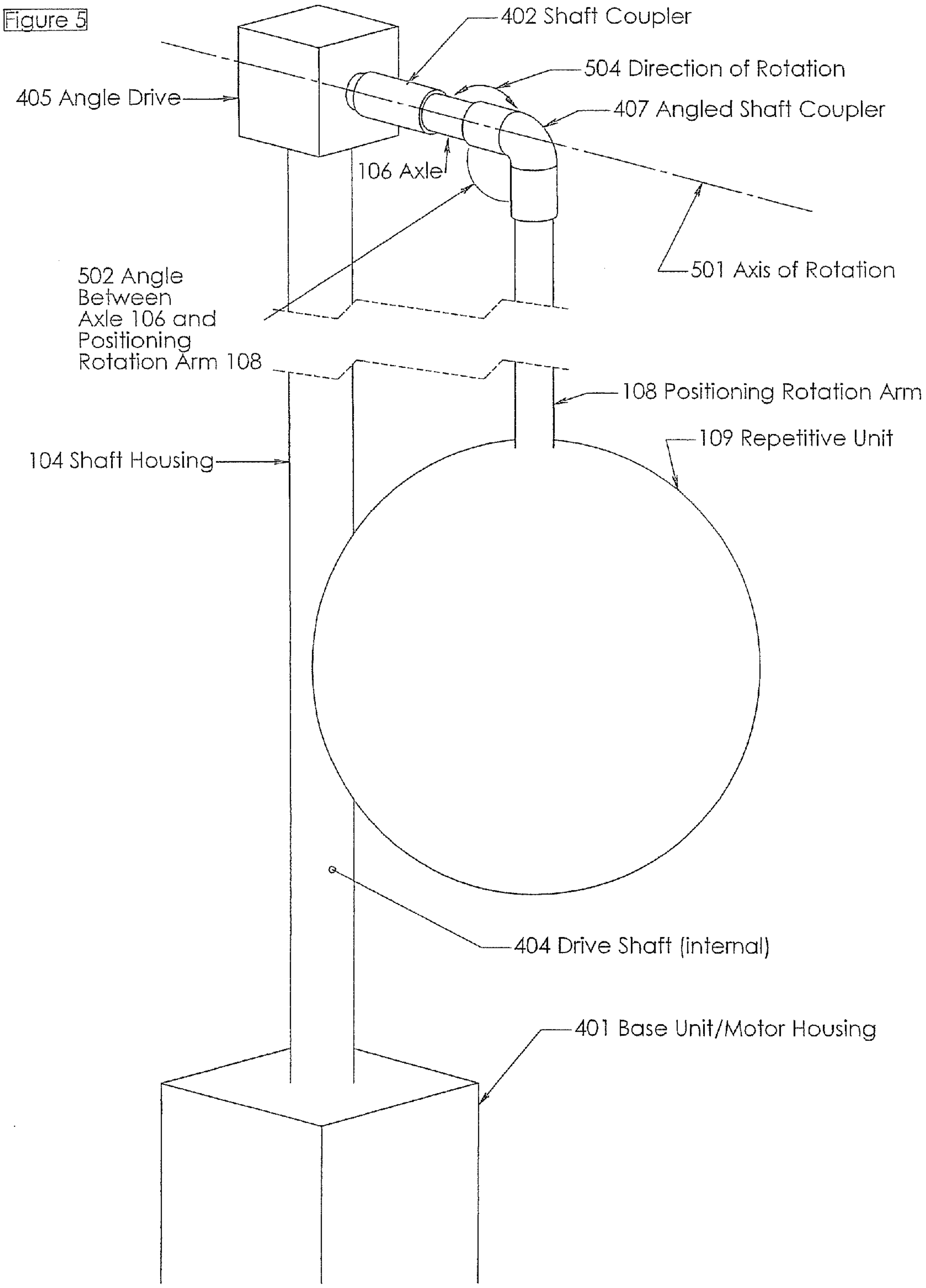
FIG. 5 is a perspective view illustrating an attached repetitive unit.

Referring to FIG. 5, the angle drive 405 interface to the positioning arm 108 and to the repetitive unit 108 is shown in a perspective view. The path of travel of the repetitive unit is defined by the rotation of the axle and the length of the positioning arm 108. In FIG. 5, the axis of rotation 501 is shown for the axle 106. The direction of rotation of the axle 106 as reflected by arrow 504 defines the rotation of the positioning arm. FIG. 5 provides a view of the angle 502 between the axle 106 and the positioning arm 108.

Figure 6:
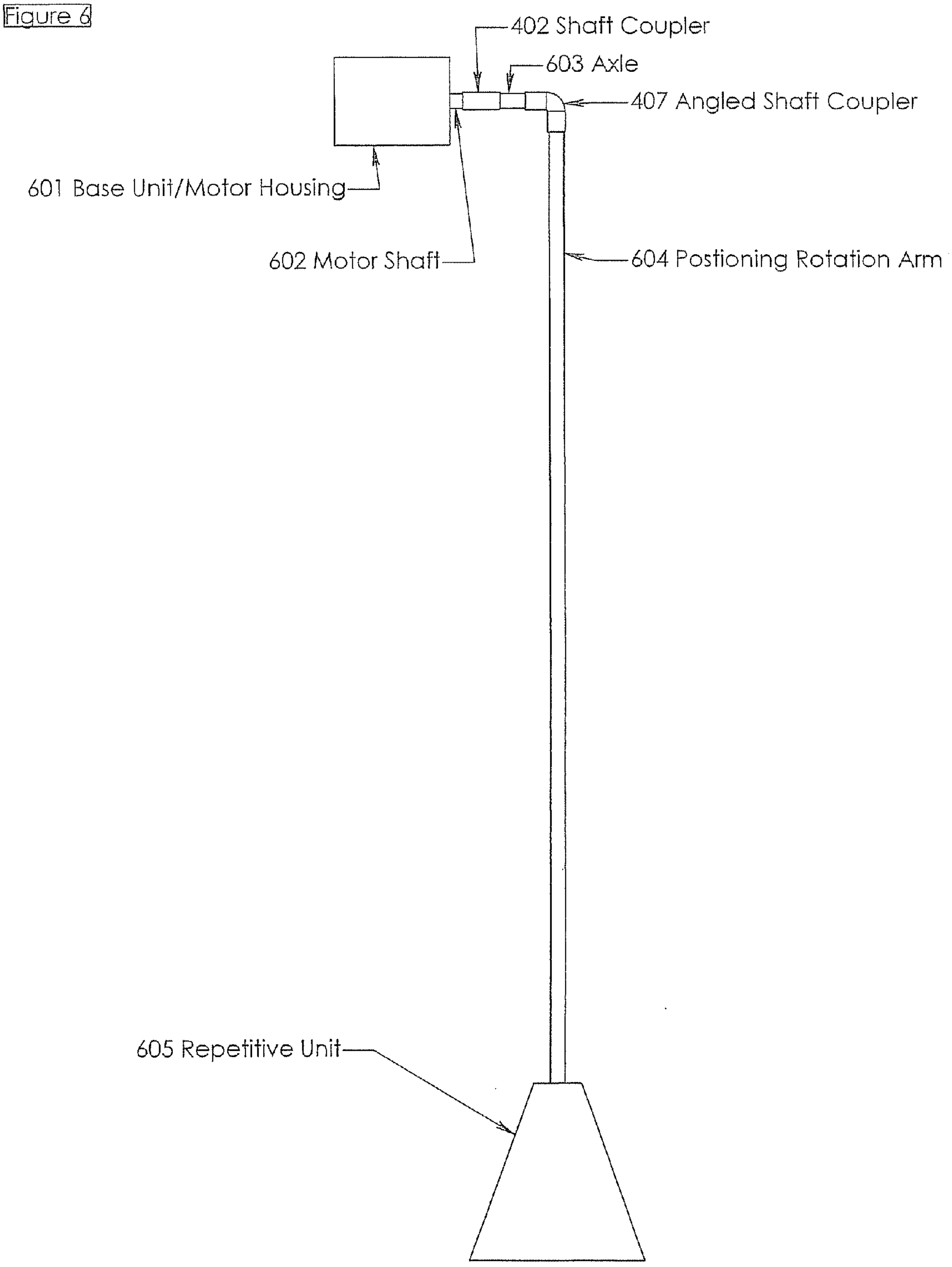
FIGS. 6 and 7 are an illustration of an alternative embodiment of the apparatus without an angle drive.
Figure 7:
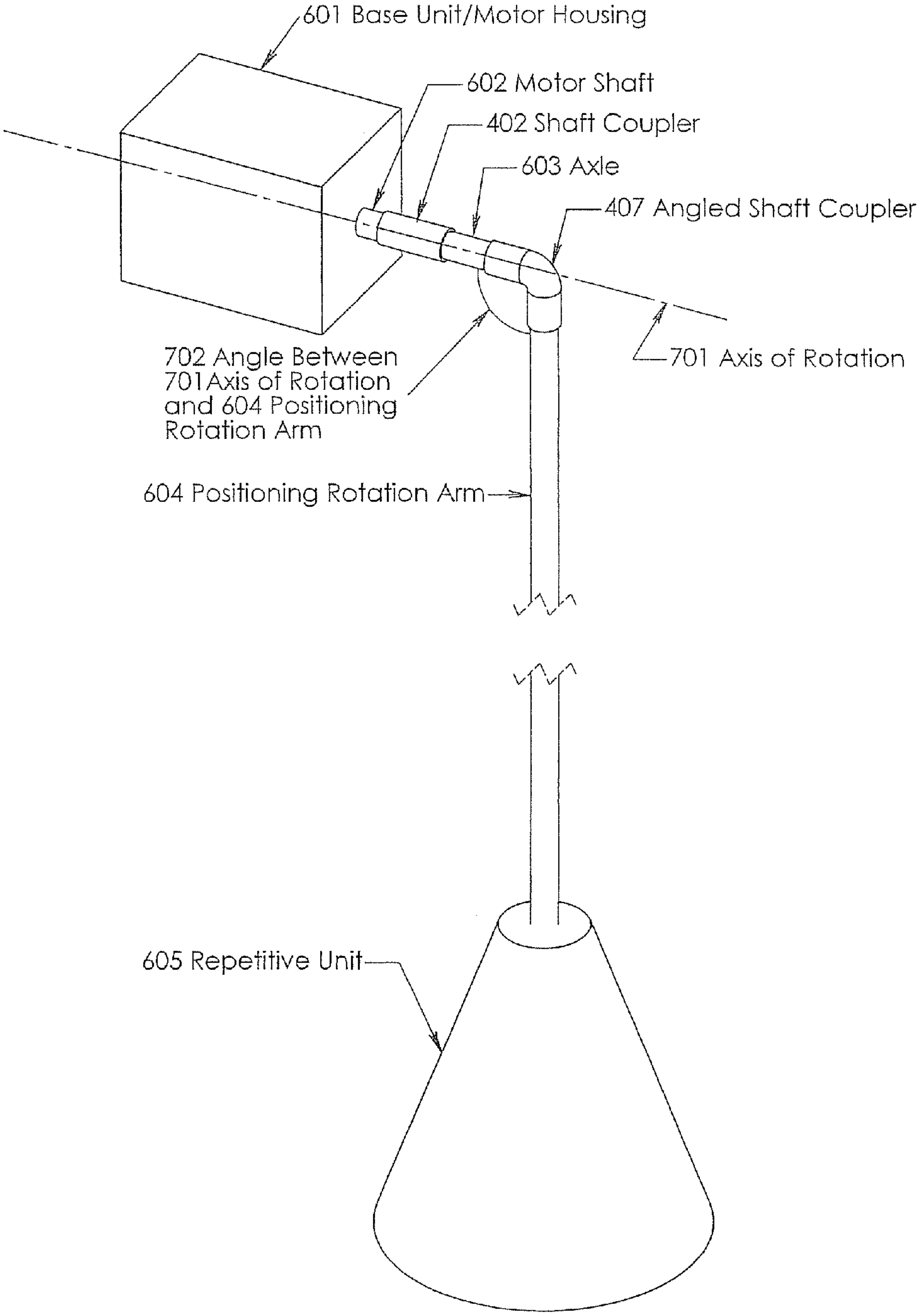

Referring to FIG. 6, the base unit/motor housing 601 can interface through a motor shaft 602 to an axle 603 and to a positioning arm 604 and to a repetitive unit 605. The rotation path again is defined by the length of the positioning arm and the rotation of the axle. In FIG. 7 the axis of rotation 701 is shown for the axle 603. The angle 702 between the axis of rotation 701 and the positioning rotation arm 604 is also shown. As seen in FIG. 6, the repetitive unit 605 can take on various geometric shapes, such as, for example, cylindrical, prism, pyramid, regular polyhedron, wedge, conical, toroid, ellipsoid, paraboloid, hyperboloid, and irregular solid shapes.

Figure 8:
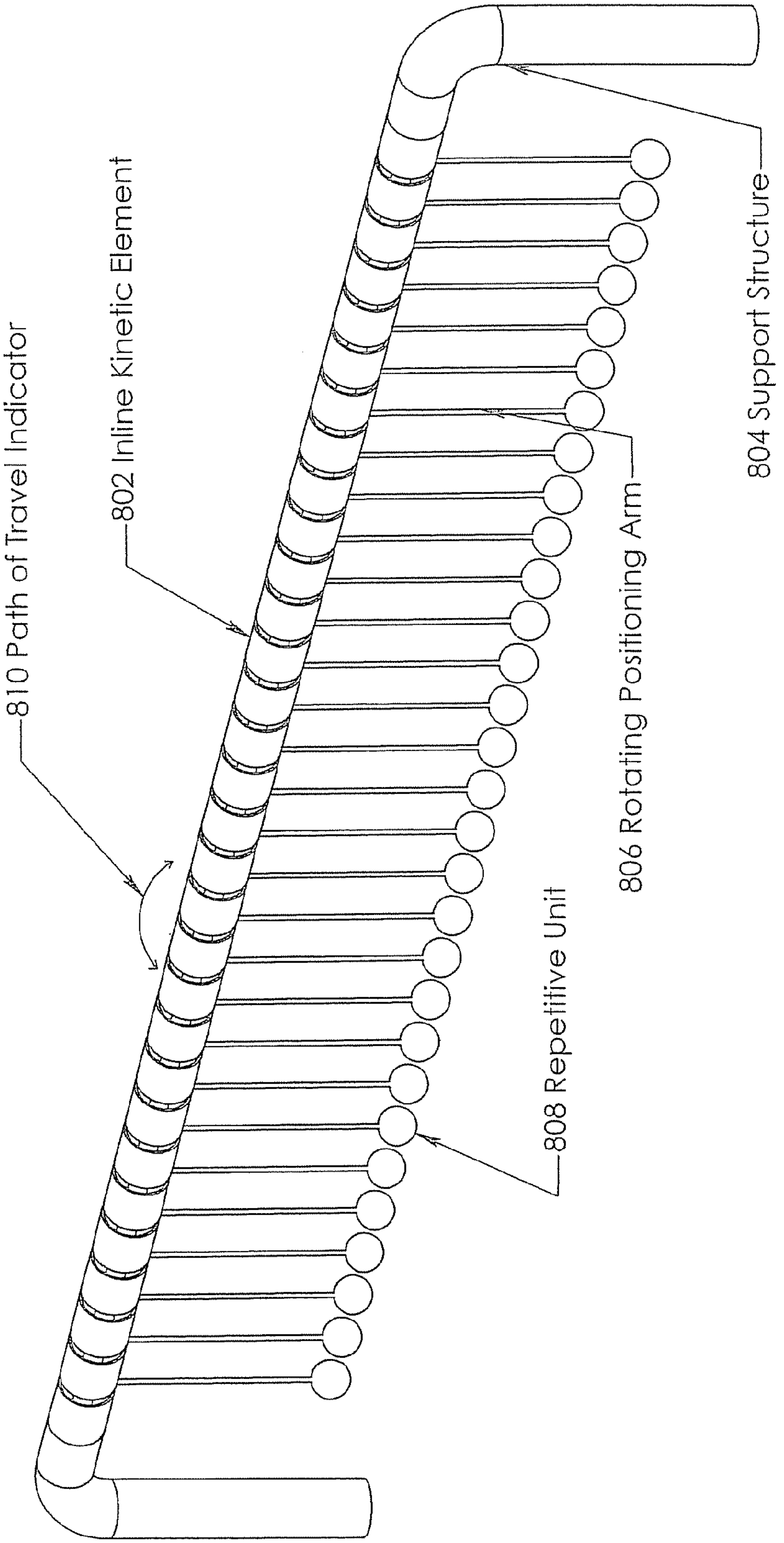
FIGS. 8 and 9 are illustrations of yet another embodiment.
Figure 9:
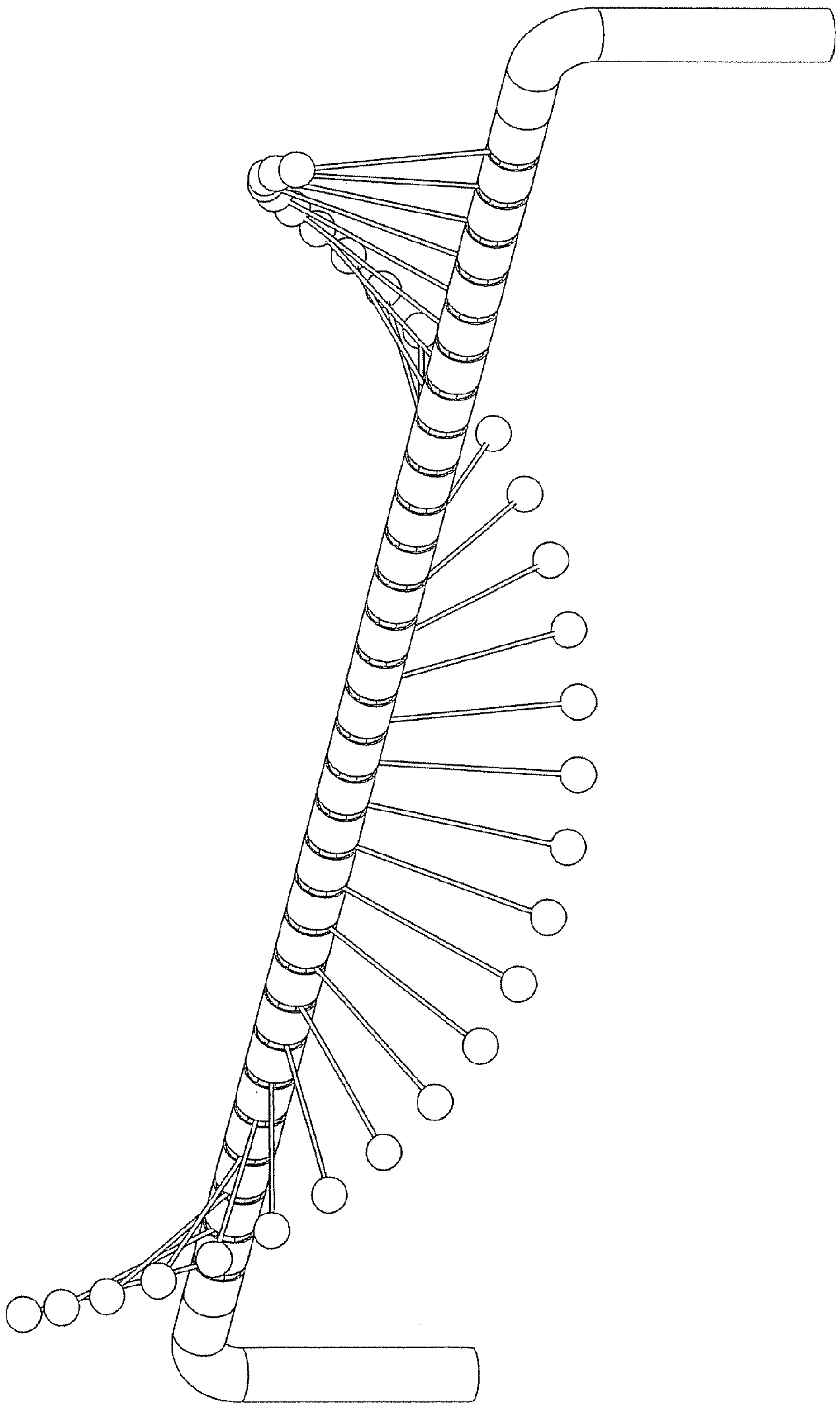
Figure 10:
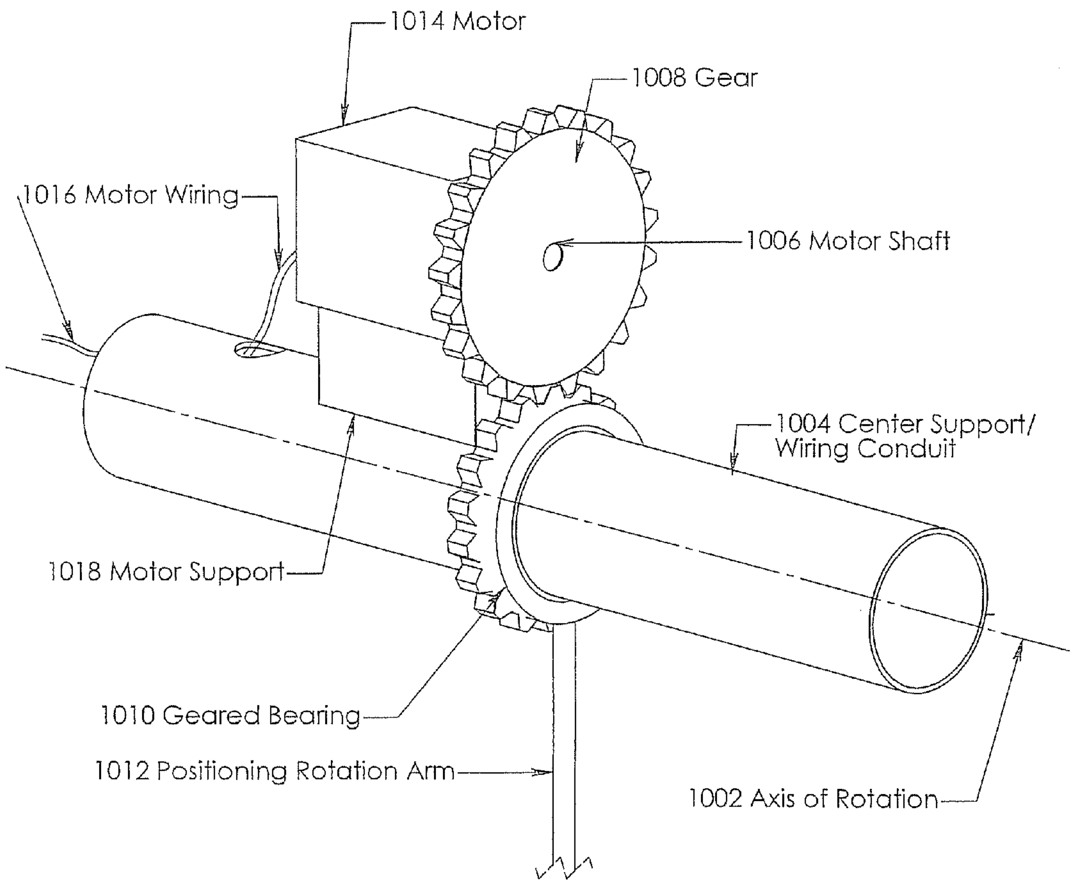
FIGS. 10 and 11 are illustrations of a kinetic element utilizing a centerless motor.
Figure 11:
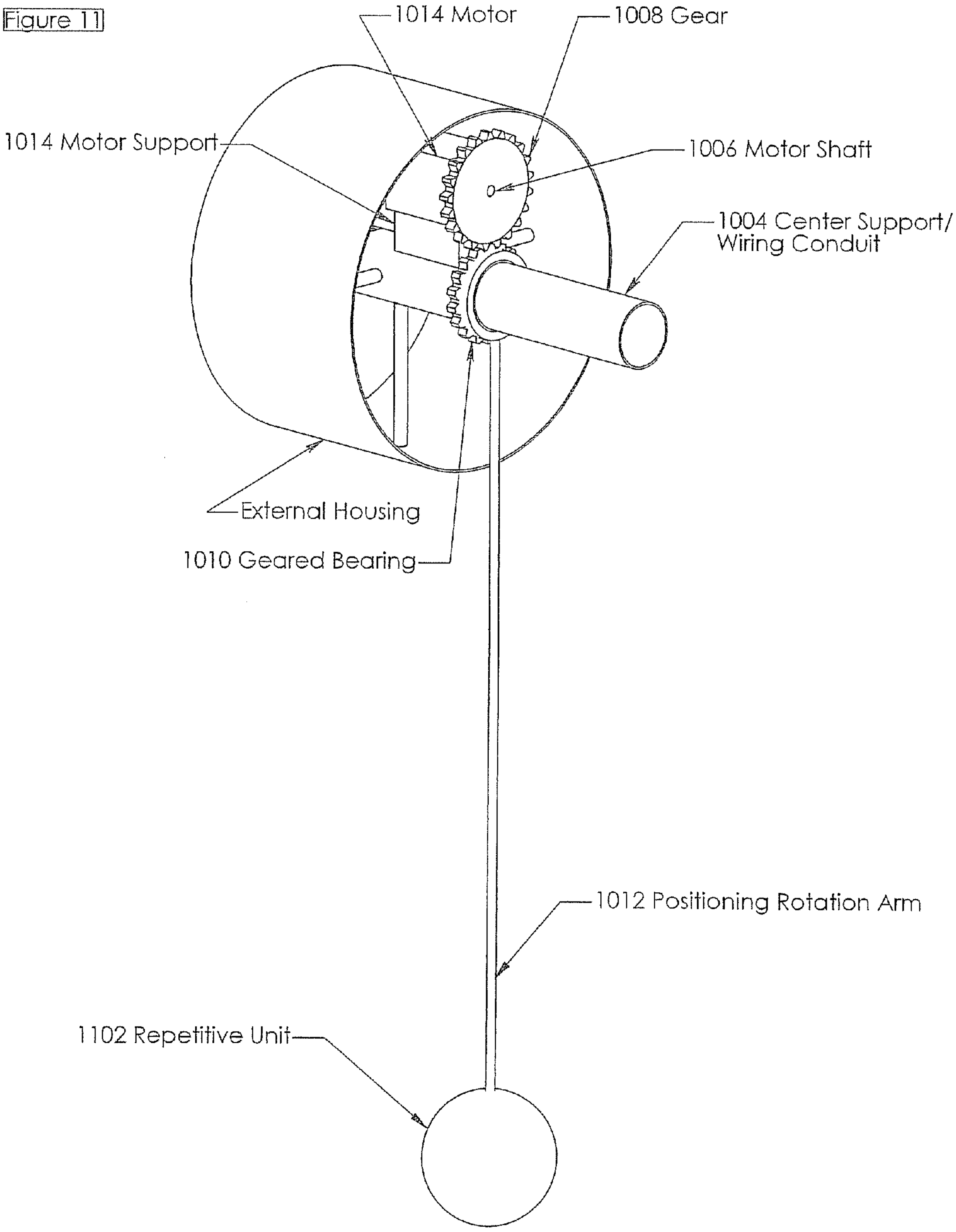
Figure 12:
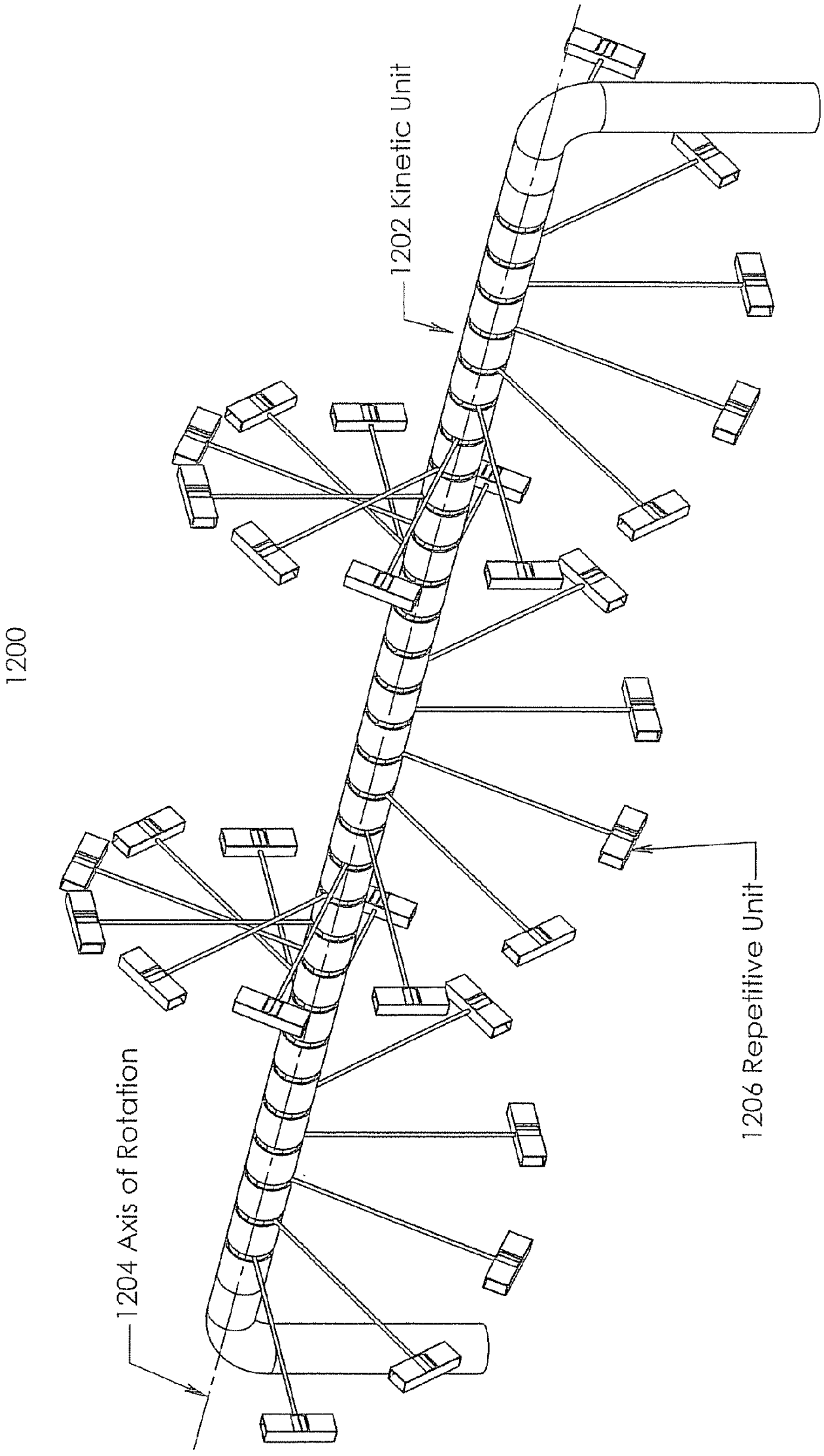
FIG. 12 is an illustration of kinetic elements arranged inline.

Referring to FIGS. 8 and 9, an alternative embodiment of the invention is shown whereby a series of inline kinetic elements 802 are shown. The inline kinetic elements 802 are supported by a tubular structure 804. A positioning arm 806 is connected between the inline series of kinetic elements 802 and the repetitive unit 808. The path of travel of the positioning arm is reflected by arrow 810. A centerless motor can be used as illustrated in FIGS. 10, 11 and 12. The axis of rotation 1002 is the center of the center support/wiring conduit tube 1004. The translation of the rotation axis from the motor shaft 1006 to the center of the support tube is accomplished by attaching a gear 1008 to the motor shaft that turns a geared bearing 1010 secured to the center support. Attached to the geared bearing is the Rotating Positioning Arm 1012. The positioning arm can have a repetitive unit 1102 attached to one end. The reason for the center support tube is so that wiring 1016 from individual motors 1014 can be run past the rotating arms without tangling (if the wiring were outside the Center Support Tube, then the wiring would interfere with the rotating arms). This embodiment can be used if a series of kinetic units is desired where there is no visible external support for each individual unit, for example, the inline configuration illustrated in FIGS. 8 and 9. All units can be supported by the center tube, meaning that as long as the tube is supported at either end, no individual kinetic unit supports are necessary. The motor 1014 can be mounted on the center support by the motor support 1018. As illustrated in FIG. 12 and similar to the embodiment shown in FIGS. 8 and 9, an inline kinetic repetitive unit positioning system 1200 is shown. The individual kinetic units 1202 are arranged inline, having a common axis of rotation 1204. Each kinetic element has a rotation positioning arm and a repetitive unit 1206. As discussed above with the other embodiments, each kinetic element can be computer-controlled to control the positional movement of the arm and repetitive unit. This can be accomplished by controlling the motor to effect rotation of its axle that can be transferred to drive rotation of the arm. The inline system can effect this transfer with the gear system as shown in FIGS. 10 and 11 and described above.

The computer or microprocessor can control the motors for the various positioning arms in order to synchronously position each of the repetitive units at a spatial location such that the relative location of the repetitive units create a geometric pattern when viewed. The computer or microprocessor can also control the spatial positions and movements of the repetitive units in such a manner that their relative movements appear random. Various computer algorithms can be performed to achieve an infinite number of combinations of spatial movements. Also, the positioning arms can vary in length and need not be straight. The circular and inline patterns of the elements can also vary. For example, the kinetic elements can be arranged in an S-shaped pattern or semicircular pattern and/or the positioning arms can each have different lengths and/or be curved or bent at angles.

The various artistic examples shown above illustrate a novel apparatus and method for implementing an artistic presentation of what can generally be referred to as kinetic art. A user of the present invention may choose any of the above artistic designs, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A system for synchronously positioning repetitive units comprising:

a plurality of repetitive units, each attached on an end of a plurality of arms, wherein said arms are angularly attached on an opposing end to a plurality of rotating axles, wherein said axles are drivably attached to a plurality of computer-controlled motors, wherein each of said plurality of arms has a computer-controlled series of positions along a path of travel, said positions being controlled by computer-driven rotation of said plurality of axles to thereby form a moving geometric pattern of said plurality of repetitive units.

2. The system as recited in claim 1, wherein each of said plurality of repetitive units is a spherically shaped repetitive unit.

3. The system as recited in claim 1, wherein each of said plurality of arms is angularly attached on an opposing end at a substantially 90 degree angle.

4. The system as recited in claim 1, wherein each of said computer-controlled series of positions for each of said plurality of arms is synchronous.

5. The system as recited in claim 1, wherein each of said computer-controlled series of positions for each of said plurality of arms appears random.

6. The system as recited in claim 1, wherein said repetitive units are disposed in a circular pattern such that the rotating arms do not cross when moving along a path of travel.

7. The system as recited in claim 6, wherein said repetitive units are disposed inline.

8. A system for synchronously positioning repetitive units comprising:

a plurality of axles each having an axis of rotation, wherein said axles are drivably attached to a plurality of computer-controlled motors for effecting rotation of said plurality of axles about said axes of rotation;

a plurality of elongated arms each including an end and an opposing end where each of said arms is attached proximate said first end at an angle to one of said plurality of axles; and a plurality of repetitive units where each unit is attached proximate said opposing end of one of said plurality of elongated arms, wherein said computer-controlled motors independently drive each of said plurality of axles for independently positioning said plurality of elongated arms and repetitive units attached thereto for a series of positions along a path of travel.

9. The system as recited in claim 8, wherein each of said plurality of repetitive units is a spherically shaped repetitive unit.

10. The system as recited in claim 8, wherein each of said plurality of arms is angularly attached on an opposing end at a substantially 90 degree angle.

11. The system as recited in claim 8, wherein each of said computer-controlled series of positions for each of said plurality of arms is synchronous.

12. The system as recited in claim 8, wherein each of said computer-controlled series of positions for each of said plurality of arms appears random.

13. The system as recited in claim 8, wherein said repetitive units are disposed in a circular pattern such that the rotating arms do not cross when moving along a path of travel.

14. The system as recited in claim 13, wherein said repetitive units are disposed inline.

15. The system as recited in claim 8, wherein each of said plurality of repetitive units is a tonal-response-generating repetitive unit.

16. A method for synchronously positioning repetitive units comprising the steps of independently rotating a plurality of axles each about its axis of rotation, said axles each being rotated with one of a plurality of computer-controlled motors, and rotating a plurality of elongated arms, wherein each axle is angularly attached to one of said plurality of elongated arms, each elongated arm having a repetitive unit attached thereto, thereby creating a pattern.

17. The method as recited in claim 16, further comprising the step of providing a spherically shaped object as the repetitive unit.

18. The method as recited in claim 16, further comprising the steps of randomly rotating the plurality of axles.

19. The method as recited in claim 16, further comprising the steps of synchronously rotating the plurality of axles.

20. The method as recited in claim 16, further comprising the steps of arranging the repetitive unit in a circular pattern.

21. The method as recited in claim 16, further comprising the steps of arranging the repetitive units in an inline arrangement and where said motors are centerless motors.

22. A system for synchronously positioning repetitive units comprising:

a plurality of sound inducing repetitive units having a structure adapted for generating a tonal response responsive to air flow, each attached on an end of a plurality of arms, wherein said arms are each angularly attached on an opposing end to a plurality of rotating axles, wherein said axles are drivably attached to a plurality of computer-controlled motors and wherein each of said plurality of arms has a computer-controlled series of positions along a path of travel, said positions are determined by computer-controlled rotation of said plurality of axles creating air flow through the structure of the repetitive units sufficient to generate a tonal response.

23. A system for synchronously positioning repetitive units comprising:

a plurality of repetitive units, each attached on an end of a plurality of arms, wherein said arms are each angularly attached on an opposing end to a plurality of rotating axles, wherein said axles are drivably attached to a plurality of computer-controlled motors and wherein each of said plurality of arms has a computer-controlled series of positions along a path of travel, said positions are determined by computer-controlled rotation of said plurality of axles, and each of said plurality of repetitive units has an illumination controllable light adapted for selective illumination responsive to the computer-controlled series of positions.

24. A system for synchronously positioning repetitive units comprising:

a plurality of repetitive units, each attached on an end of a plurality of arms, wherein said arms are each angularly attached on an opposing end to a plurality of rotating axles, wherein said axles are drivably attached to a plurality of computer-controlled motors and wherein each of said plurality of arms have a computer-controlled series of positions along a path of travel, and said positions are determined by computer-controlled rotation of said plurality of axles forming a moving geometric pattern with said plurality of repetitive units, where the computer controlled rotation of said plurality of axles is responsive to an audio signal.

* * * * *